United States Patent [19]

Patterson et al.

[11] 4,430,251

[45] Feb. 7, 1984

[54] HIGH ENERGY EMULSIFIER

[75] Inventors: William P. Patterson; Ronald J. Bailey, both of Jacksonville, Fla.

[73] Assignee: Hoffert Manufacturing Co., Inc., Jacksonville, Fla.

[21] Appl. No.: 307,319

[22] Filed: Sep. 29, 1981

[51] Int. Cl.³ .................... B01F 5/08; B01J 13/00
[52] U.S. Cl. .................... 252/359 R; 44/51; 149/46; 252/312; 252/314; 261/DIG. 56; 426/586
[58] Field of Search ............. 252/314, 359 A, 359 D, 252/359 R; 261/DIG. 56; 149/46; 366/165

[56] References Cited

U.S. PATENT DOCUMENTS

| | | | |
|---|---|---|---|
| 2,021,143 | 11/1935 | Calcott et al. | 252/314 X |
| 2,361,150 | 10/1944 | Petroe | 137/44 X |
| 2,382,871 | 8/1945 | Gerhold | 252/314 |
| 3,396,537 | 8/1968 | Lissant et al. | 149/36 X |
| 3,554,228 | 1/1971 | Schneider | 137/599 |
| 3,743,555 | 7/1973 | Seaman | 149/36 |
| 3,937,445 | 2/1976 | Agosta | 366/341 |
| 4,081,863 | 3/1978 | Rees | 366/176 |
| 4,087,862 | 5/1978 | Tsien | 366/165 |
| 4,123,800 | 10/1978 | Mazzei | 366/150 |
| 4,127,332 | 11/1978 | Thiruvengadam et al. | 366/131 |
| 4,258,367 | 8/1981 | Nommensen | 137/888 |
| 4,334,783 | 6/1982 | Suzaka | 366/69 |
| 4,344,752 | 8/1982 | Gallagher, Jr. | 252/359 A X |

FOREIGN PATENT DOCUMENTS 56-81126  7/1981  Japan ............... 252/359 A

OTHER PUBLICATIONS

Campbell et al., "The Science of Providing Milk for Man", McGraw-Hill Book Co, 1975, pp. 552–553.

Primary Examiner—Richard D. Lovering
Attorney, Agent, or Firm—Dula, Shields & Egbert

[57] ABSTRACT

An apparatus and method for the emulsification of fluids. Mixing of the fluids may occur before the fluids enter the apparatus, or in the apparatus. Extremely low pressure is created and maintained in an apparatus chamber by accelerating the flow velocity of at least one fluid as flow occurs from a larger to a smaller diameter passageway. Vapors of the fluids to be emulsified mix in said low pressure passageway, which may be a venturi tube. When the mixed vapors flow from the smaller diameter passageway to a second larger diameter outlet passageway, deceleration results in a pressure increase which causes the mixed vapors to collapse into the emulsified products. A single emulsification in the apparatus produces emulsified particles with diameters in the range of 0.01 to 2 microns. The apparatus is capable of homogenizing milk, emulsifying fuel and water, emulsifying solutions with immiscible fluids, and producing other regular or thixotropic emulsions.

5 Claims, 11 Drawing Figures

HIGH ENERGY EMULSIFIER

BACKGROUND ART

The present invention relates to a process and apparatus for emulsifying two or more immiscible substances.

Certain combustion characteristics of fuel oil can be improved substantially by emulsifying the oil with water. One reason for this is that current oil atomizing technology produces an oil droplet of a size that requires a quantity of excess air over the stoichiometric needs of combustion. However, a stoichiometric matching of air, oxygen and an oil droplet is a primary determination of combustion efficiency and, to a degree, the heat transfer efficiency of a furnace. This is because the differential of heat absorption between air and a furnace heat transfer surface causes heat to be carried out of the furnace in the form of elevated flue gas temperatures in the excess air flow. On the other hand, an atomized emulsified fuel oil droplet emulsified in water is reduced to a much smaller size by the violent expansion of the water when the emulsion is exposed to elevated furnace temperatures. This secondary atomization of the fuel oil droplet permits a closer stoichiometric matching of air, oxygen and the fuel oil, and hence a substantial reduction in heat loss due to excess air flow.

However, due to certain limitations in emulsification techniques currently in use, only a fraction of the improved combustion characteristics of fuel oils emulsified with water are achieved in practice. This is because the current state of the art fuel oil/water emulsions, which are 3 to 10 microns in diameter, contain too much water. Since some fuel oil combustion heat energy is expended in the vaporization of the emulsified water particle, and in elevating its temperature to furnace gas temperature, it is clear that a reduction in the water volume would reduce water temperature elevation and heat of vaporization losses accordingly. Since water in the emulsion is spherically shaped, the volume relationship is a cubic function of the diameter. Thus, a 1-micron water particle would contain 1/1000 as much water as a 10-micron particle and 1/27 as much water as a 3-micron particle. A uniform dispersion of 1-micron water particles in the oil droplet should cause secondary atomization at furnace temperatures with 0.1 to 4 percent of the water induced heat losses that occur in state of the art emulsions.

Another limitation of state of the art emulsion devices is their inability to function over a broad range of fluid viscosities. Generally, fluid viscosity variations in state of the art devices result in a varying degree of dispersion and an unpredictable component particle size.

State of the art emulsifiers for example, that taught by U.S. Pat. No. 3,937,445, function by causing the formation of vapor bubbles within a liquid at low pressure regions where the liquid has been accelerated to high velocities. This process is called "cavitation" because cavities form when the pressure of the liquid has been reduced to its vapor pressure. These vapor bubbles expand while they move along with the flow and suddenly collapse when they reach regions of higher pressure. The sudden and violent growth and collapse of these vapor cavities within a liquid cause the intense shearing forces that cause the emulsification to occur.

In view of the above, the principle object of the present invention is to provide an improved process and apparatus for the emulsification of two or more immiscible substances.

Another principle object of the present invention is to provide a process and apparatus that will produce uniform minimum component particle size over a broad range of fluid viscosities. A specific object of the present invention is to proivde a process and apparatus that will produce emulsified water particles that are 1-micron in diameter, or less.

Still another principle object of the present invention is to provide a process and apparatus that will produce an emulsion that is an agglomeration of two or more immiscible substances.

Yet another principle object of the present invention is to provide a process and apparatus that will use a minimum amount of electro-mechanical energy to create small particle size emulsions.

Yet a further principle object of the present invention is to provide a process and apparatus that will optimize process pressure recovery.

Another specific object of the present invention is to provide a process and apparatus that will reduce emulsification production costs and installation modifications to existing facilities.

DISCLOSURE OF THE INVENTION

The present invention differs from cavitation emulsifiers in that the present invention functions by causing the formation of vapor bubbles of all the fluids to be emulsified in a vapor phase. Unlike cavitation emulsifiers, the present invention does not use a liquid phase during emulsification. The vapors of two or more fluids to be emulsified are formed and mixed when one of the fluids is accelerated to high velocities thereby creating a low pressure region in a chamber, and the other fluid or fluids are introduced into the low pressure chamber.

When the mixed vapors exit the high velocity, low pressure chamber into a higher pressure chamber, the vapors suddenly compress about one another, thereby causing the emulsification to occur.

One or more of the fluids to be emulsified may be a solution of one or more solutes. One or more of said solutes may be partially or wholly dissociated into cations and anions, or one or more of the solutes may not be dissociated. Undissociated solutes may have Clausius-Clapeyron pressures above the extremely low vaporizing pressures reached in the present invention. Such solutes should form vapor bubbles during emulsification of their solvents with one or more immiscible fluids. These solute vapor bubbles should mix with vapor bubbles of the solvent or solvents and the immiscible fluid or fluids in the present invention, and, when the mixed vapor bubbles collapse, the solute or solutes should be distributed in the emulsification either as solute in original solvent, or in one or more of the immiscible fluids, or both, or emulsified with the immiscible fluids, or both, or all three. On the other hand, dissociated solutes and undissociated solutes with Clausius-Clapeyron pressures below the extremely low vaporizing pressures reached in the present invention, would not be expected to vaporize along with their solvents. Such solutes should form fine particles during vaporization of their solvents. These fine particles may serve as condensation nuclei for the solute or solutes and immiscible fluid or fluids and thereby promote emulsification. Further, these fine particles should mix with the vapor bubbles of the solvent or solvents and the immiscible fluid or fluids in the present invention, and, when the mixed vapor bubbles collapse, the solute or solutes should be distributed in the emulsification either dissolved in original solvent, or in one or more of the immiscible fluids, or both, or emulsified with the immiscible fluids, or both, or all three.

Further, the present invention may use solid particles as condensation nuclei and thus is capable of using solids as one or more of the emulsified substances.

The emulsification achieved by the present invention is unique in that an agglomeration of the immiscible components is achieved. The agglomeration comprises finer particle sizes and dispersion than were previously possible from state of the art emulsifiers.

The above and other beneficial objects and advantages are attained in accordance with the present invention which provides an apparatus and method for obtaining the emulsification of two or more immiscible fluids. Accelerated flow of one of the fluids creates low pressure in a mixing chamber wherein vapors of the fluids to be emulsified are mixed. The vapors collapse at higher pressures and an agglomeration of the immiscible components is achieved. The resulting emulsified components are of finer particle size and dispersion than was previously possible from state of the art emulsifiers.

THEORETICAL BASIS OF THE INVENTION

The theoretical basis for the present invention can be deduced from Newton's second law.

$$F = ma \qquad (1)$$

where F is the force acting on a body of mass m and acceleration a. Applying equation (1) to a fluid particle having an elemental area, $\delta A$, length $\delta s$, and density $\rho$ in the direction along a horizontal streamline in steady, incompressible, frictionless flow, we obtain a differential equation which expresses the fact that the force acting on the fluid particle is the sum of a force acting uphill, $P\delta A$, where P is the pressure, and a force acting downhill equal to minus the pressure which has changed by an increment $\partial P$ times area, or $$\left(P + \frac{\partial P}{\partial s}\delta s\right)\delta A; \rho\delta A\,\delta s\,a = P\delta A - \left(P + \frac{\partial P}{\partial s}\delta s\right)\delta A \qquad (2)$$

Equation (2) reduces to:

$$ads + (dP/\rho) = 0 \qquad (3)$$

the acceleration component, a, being the change of velocity with time, dv/dt may be written as the product of the particle velocity along its path, $v = ds/dt$ and the change of velocity with distance along the path, dv/ds, or $$a = dv/dt = (ds/dt)(dv/ds) = v(dv/ds) \qquad (4)$$

Substituting v(dv/ds) for a in equation (3) yields $$dv + (dP/\rho) = 0 \qquad (5)$$

Equation (5) is readily integrated to yield, $$(V^2/2g) + (P/\rho g) = \text{CONSTANT} \qquad (6)$$

where g=gravitational constant. The first term in equation (6) is the kinetic energy of the particle due to its velocity, v. The second term is the potential energy that the fluid is capable of yielding because of its sustained pressure, sometimes called the "flow work" of the system.

Because the sum of the two energy terms in equation (6) is constant, increasing the kinetic energy (that is, increasing the flow velocity) results in a decrease in the pressure surrounding the particle.

The present invention may function by utilizing the principle which equation (6) states. The kinetic energy of a fluid is increased by increasing its flow velocity. This results in a pressure decrease which is proportional to the square of the velocity increase. This relationship demonstrates how the accelerated flow velocity achieved by the present invention may be sufficient to cause extremely low pressure in the increased velocity chamber. When the pressure in this chamber falls below the Clausius-Clapeyron pressure for substances in the chamber, the substances all vaporize and mix. When the mixed vapors exit the chamber, the flow velocity of the fluids decreases, and as required by equation (6), the pressure increases, resuming a value above the Clausius-Clapeyron pressure for each of the mixed fluids. When the mixed vapors suddenly collapse, the resultant substances emulsify.

This theoretical discussion is set forth to help teach the invention. It should not be read as limiting the scope of the invention.

DETAILED DESCRIPTION OF THE PREFERRED EMBODIMENT

Figure 1:
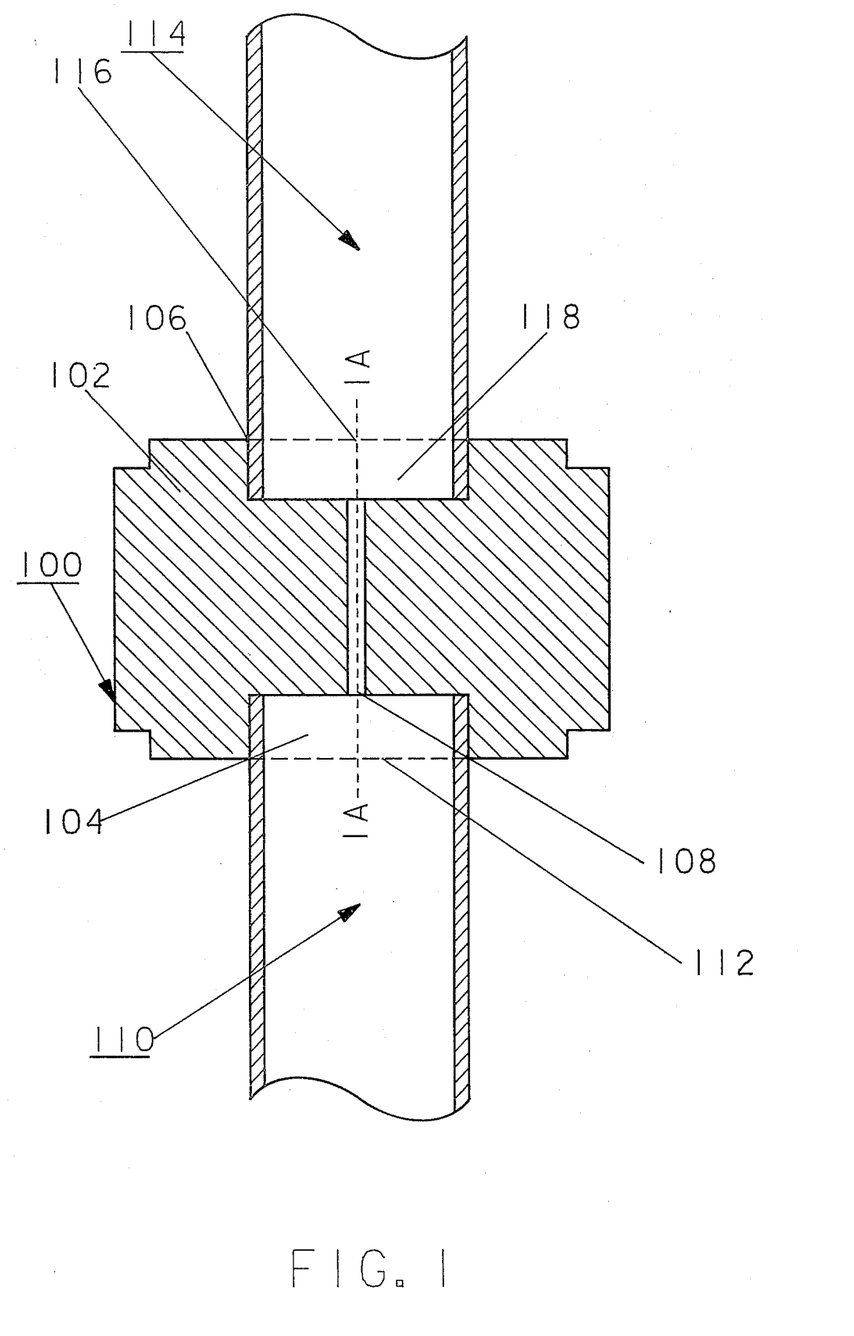
FIG. 1 is a side elevational view of the simplest embodiment of the invention.

FIG. 1 illustrates the simplest embodiment of the present invention wherein two fluids to be emulsified are mixed prior to acceleration in a single low pressure channel of constant cross-sectional area.

Structurally, emulsifier 100 in FIG. 1 is a block 102 made of any material capable of withstanding the flow of fluids. Inlet chamber 104, which is typically a two inch diameter cylinder about one half inch long, is in fluid communication with channel 106 at inlet 108. Typically, channel 106 is a cylinder that has a longer length and a much smaller diameter than chamber 104, typically one to three inches long with a diameter in the range of one fourth inches. Chamber 104 is in fluid communication with inlet pipe 110, which is typically one to two inches in diameter, at inlet 112, and channel 106 is in fluid communication with outlet pipe 114, which is also typically one to two inches in diameter, at outlet 116 via outlet chamber 118. The centers of chambers 104 and 118 and channel 106 are the locus of line 1A—1A.

Since the cross-sectional area of a cylinder is proportional to the square of the radius, the cross-sectional area of channel 106 is typically much smaller than the cross-sectional areas of pipes 110 and 114.

Pipes 110 and 114, which may be constructed of any material capable of withstanding the flow of fluids, are connected to emulsifier 100 by means well known to those skilled in the art of pipe connections.

Functionally, a mixture of the fluids to be emulsified enters the apparatus 100 through pipe 110 and inlet 112 at chamber 104 at relatively low velocity under relatively high pressure. Typical conditions for pipe 110 comprise flows in the range of 50 gallons per minute (gpm) at 300 pounds per square inch (psi) of pressure.

The fluids exit pipe 110 and chamber 104 and enter channel 106. Since the flow velocity in a cylinder is inversely proportional to the cross-sectional area, the velocity in channel 106 is expected to be many times the velocity in pipes 110 and 112. Finally, since the total energy of the system is a constant comprising the flow work, which is proportional to the pressure, and the kinetic energy, which is proportional to the square of the velocity, a large increase in velocity when the fluids enter channel 106 represents a very large kinetic energy increase which manifests itself as a very large decrease in the flow work, and therefore a very large decrease in the pressure. As this pressure decrease reduces the pressure in channel 106 below the Clausius-Clapeyron pressures for the fluids, the fluids vaporize in channel 106, thereby forming mixed vapors of the fluids to be emulsified.

The mixed vapors exit channel 106 at outlet 116 via chamber 118 and enter pipe 114. Since the cross-sectional area of pipe 114 is much larger than the cross-sectional area of channel 106, the substances decelerate upon entering pipe 114, and, as indicated by equation (6), the pressure increases. However, even when the Clausius-Clapeyron pressure for a component of the mixed vapors of the substances to be emulsified is exceeded, there is a transitory period or relaxation time during which the system is tending toward, but is not yet at thermodynamic equilibrium. During this transitory state, the kinetics describing the collapse of the supercooled vapors permit a tail of mixed supercooled vapors to extend into pipe 114. Eventually, this vapor mixture collapses to its equilibrium state in pipe 114 as an emulsified mixture.

Figure 2:
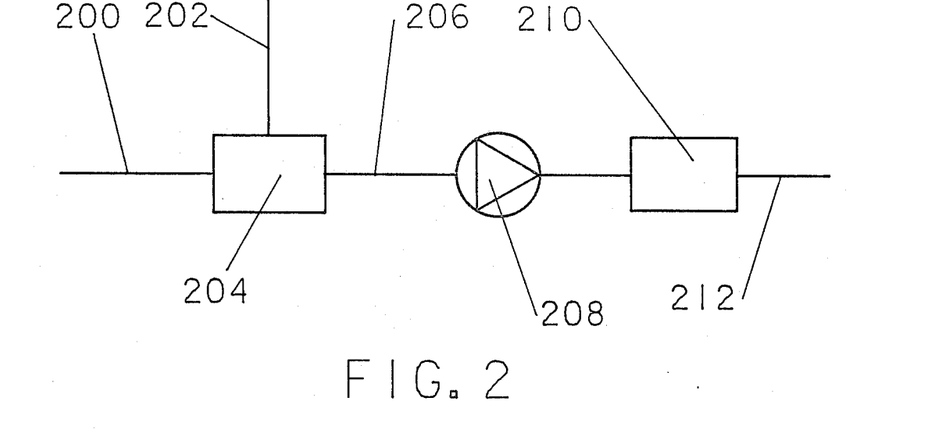
FIG. 2 is a schematic flow diagram for a system utilizing the present invention.

FIG. 2 shows a schematic representation of a system incorporating the simplest version of the present invention, as was described above and illustrated in FIG. 1. In this system the two fluids, e.g. fuel oil & water or milk and cream, to be emulsified flow through pipes 200 and 202, respectively, to mixing valve 204. The mixture flows from valve 204 through pipe 206 to the input side of a pump 208, which pumps the mixture to the present invention 210. The emulsified mixture leaves the present invention 210 through pipe 212.

In an alternative configuration, pump 208 could be placed after, rather than before, the invention 210.

Figure 3A:
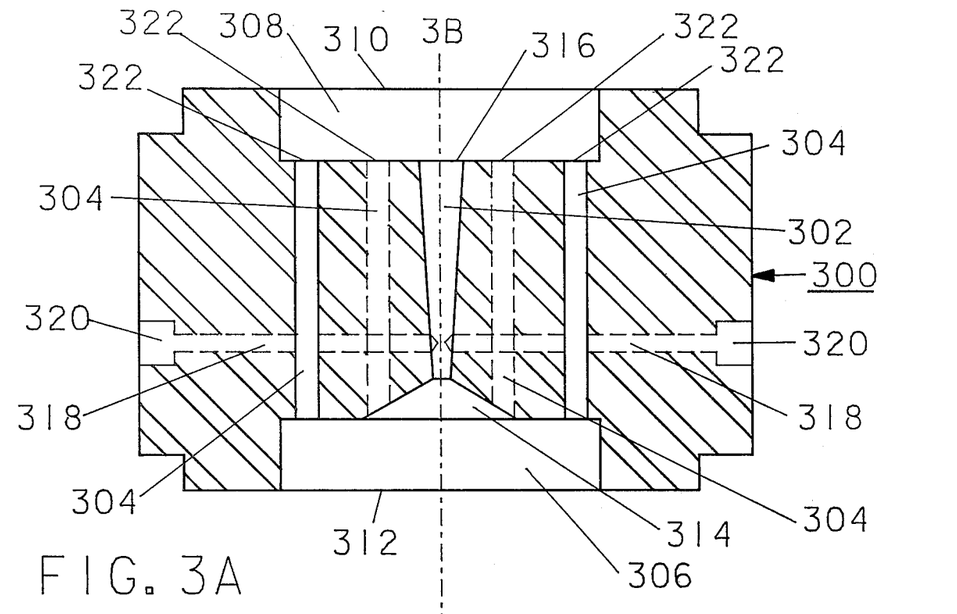
FIG. 3A is a side elevational view and FIG. 3B is a front elevational view of the preferred embodiment of the present invention.

FIG. 3 (esp. FIG. 3A) shows the preferred embodiment of the emulsifier 300 in cross-section.

A plurality of relatively small channels 302 and 304 in emulsifier 300 place inlet chamber 306 in flow communication with outlet chamber 308. The outlet of passageways 302 and 304 are angularly and radially set in outlet side 310 of emulsifier 300, thereby promoting vapor mixing, as is described below. Typically, passageways 304 are cylinders with diameters in the range of one fourth inch. Passageway 302 is a venturi tube with an inlet diameter in the range of one and one half inches, a tapered throat with a minimum diameter at constriction 314 which is in the range of one fourth inch, a throat taper in the range of three degrees, and a larger tapered throat diameter at outlet 316.

A plurality of channels 318 place channel 302 in flow communication with inlets 320 of emulsifier 300. Typically, channels 318 and inlets 320 are cylindrical with diameters in the range of one fourth inch and one half inch, respectively.

Figure 3B:
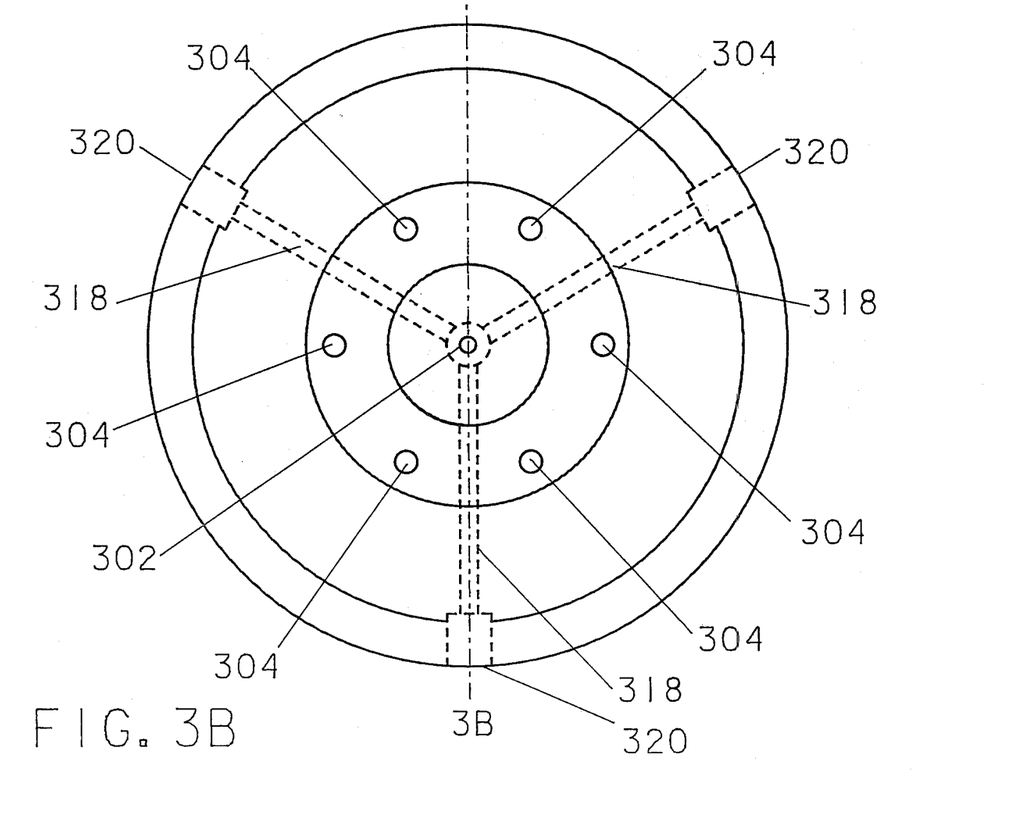

FIG. 3B, which is a partially cut-away view taken along line 3B—3B of FIG. 3A, shows one variable diameter venturi tube 302, six constant diameter cylindrical tubes 304, and three cylindrical inlet tubes 318. Other numbers and combinations of these tubes are contemplated by the present invention, including the use of one or more variable diameter tubes in place of one or more of the constant diameter tubes 304 or one or more of the inlet tubes 318.

In the preferred embodiment shown in FIG. 3A and 3B, the center passageway 302 is a venturi tube whose axis of rotation is coincident with the center axis of the emulsifier 300 between chambers 306 and 308. Straight passageways 304 are evenly radially disposed outward at even angular offsets from venturi 302. Different angles and arrangements of passageways may be used without departing from the present invention.

In FIG. 3 a first fluid to be emulsified, for example fuel oil, more generally, $F_1$, flows into emulsifier 300 at inlet side 312 of emulsifier 300 at relatively low velocity under relatively high pressure. Typical conditions for entry are similar to those described previously in connection with FIG. 1 for entry into emulsifier 100.

As described above in connection with channel 106 in FIG. 1, since the cross-sectional area of a cylinder is proportional to the square of the radius, and the flow velocity through a cylinder is inversely proportional to the cross-sectional area, the fluid velocity in tubes 302 and 304 is expected to be much greater than the velocity of the fluid entering emulsifier 300. As further described above in connection with channel 106 in FIG. 1, this large velocity increase in channels 302 and 304 represents a very large kinetic energy increase at the expense of flow work. As the resultant low pressure in channels 302 and 304 falls below the Clausius-Clapeyron pressure for $F_1$, $F_1$ vaporizes in these channels.

$F_1$ accelerates virtually instantaneously when it enters tubes 304, but when $F_1$ enters venturi tube 302 the velocity increases more gradually to its maximum value at the minimum diameter point in the throat at constriction 314. The result is that pressures achieved in tube 302 are very low due in part to the fact that the desired equilibrium pressure is obtained with less loss due to irreversible processes.

One or more other fluids to be emulsified with $F_1$, e.g. water from a source not shown, more generally F, are introduced into tube 302 via inlet 320 and channel 318. The low pressure in tube 302 permits the introduction of F without disruption of the sub-Clausius-Clapeyron pressure conditions for the added fluids. Therefore, upon entering tube 302, the F vaporize and mix with the vapors of $F_1$ already flowing through tube 302.

The mixed vapors exit tube 302 at outlet 316 for mixing with additional vapors of $F_1$ exiting tubes 304 at outlets 322.

Figure 4:
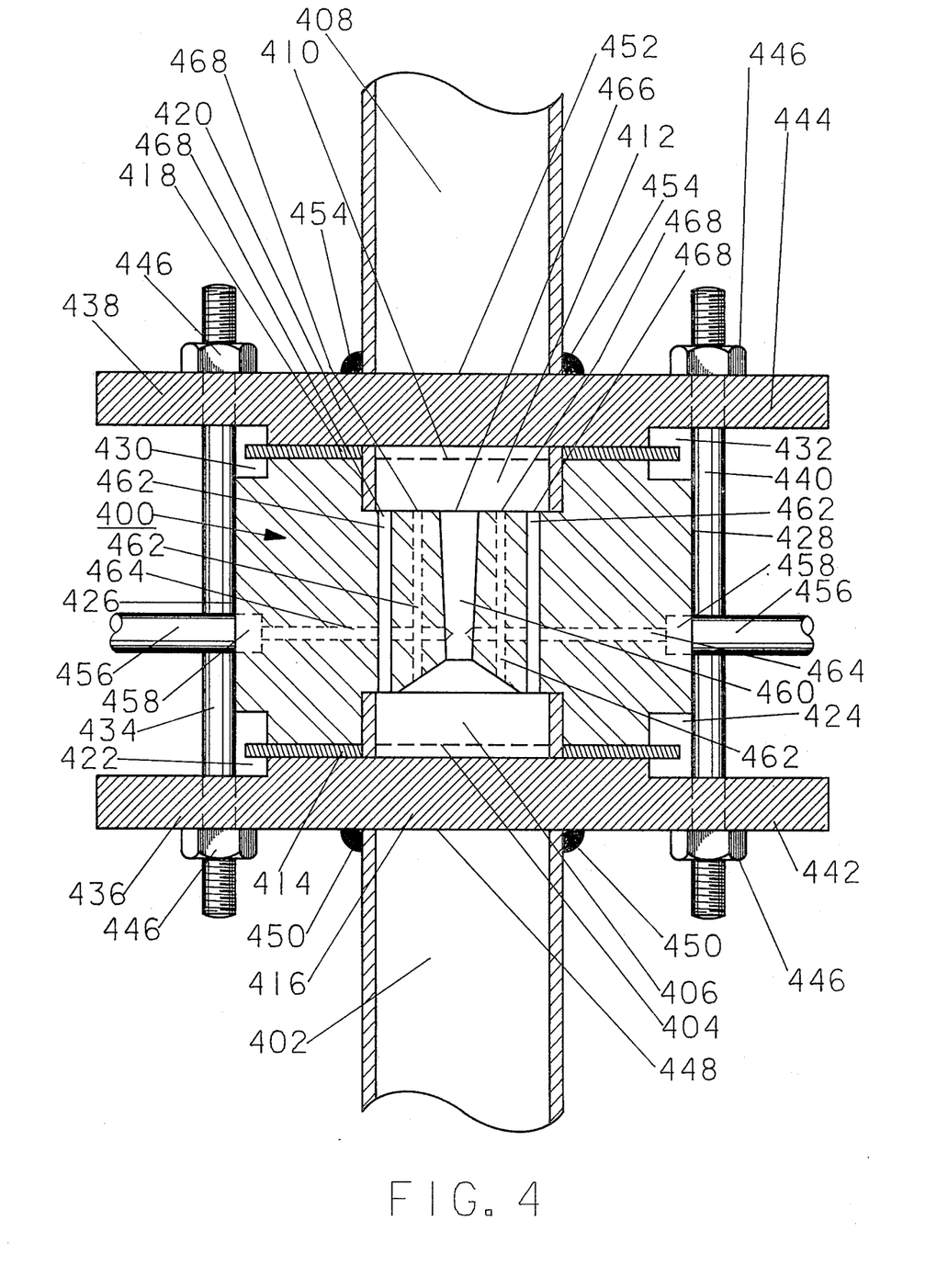
FIG. 4 is a side elevational view of the preferred embodiment of the present invention with inlet and outlet pipes in place.

FIG. 4 illustrates the preferred embodiment of the present invention together with means for intake of unmixed fluids and outlet of emulsified fluids.

Emulsifier 400 in FIG. 4 is identical to emulsifier 300 described in detail in FIG. 3.

Inlet pipe 402 is attached to inlet side 404 of emulsifier 400 through inlet chamber 406. Inlet pipe 402 must be the same diameter as chamber 406, typically one to two inches. Outlet pipe 408 is attached to outlet side 410 of emulsifier 400 through outlet chamber 412. Outlet pipe 408 must be the same diameter as chamber 412, typically one to two inches.

Inlet gasket 414 separates inlet flange 416 from emulsifier 400 on inlet side 404. Outlet gasket 418 separates outlet flange 420 from emulsifier 400 on outlet side 410. Gasket 414 terminates in spaces 422 and 424 on the top 426 and bottom 428, respectively, of the inlet side 404 of emulsifier 400. Gasket 418 terminates in spaces 430 and 432 on the top 426 and bottom 428, respectively, of the outlet side 410 of emulsifier 400.

Pipes 402 and 408 and flanges 416 and 420 may be secured by any suitable means. In FIG. 4 flanges 416 and 420 are secured by top studs 434 between the top 436 of flange 416 and the top 438 of flange 420 along the top 426 of emulsifier 400 and bottom studs 440 between the bottom 442 of flange 416 and the bottom 444 of flange 420 along the bottom 428 of emulsifier 400 and retaining nuts 446.

Inlet pipe 402 is secured through opening 448 in flange 416 by welded joints 450. Outlet pipe 408 is secured through opening 452 in flange 420 by welded joints 454.

Inlet pipes 456 are attached by any suitable means to inlets 458 of emulsifier 400.

Pipes 402, 408 and 456, flanges 416 and 420, gaskets 414 and 418, and studs 434 and 440 may be made of any material capable of withstanding fluid flow.

The preferred embodiment of the present invention shown in FIG. 4 functions in the same manner as emulsifier 300 described in connection with FIG. 3.

Since the cross-sectional area of inlet pipe 402 is much larger than the combined cross-sectional areas of channels 460 nd 462, the fluid entering channels 460 and 462 from pipe 402, accelerates, and, as indicated by equation (6) above, the pressure in channels 460 and 462 decreases to a very low value. As this pressure decrease reduces the pressure in channels 460 and 462 below the Clausius-Clapeyron pressure for $F_1$, $F_1$ vaporizes in channels 460 and 462.

One or more other fluids, F, to be emulsified with $F_1$ are introduced into channel 460 via inlet pipes 456, inlets 458 and channels 464 in emulsifier 400. The low pressure in channel 460 permits the introduction of F without disruption of pre-existing sub-Clausius-Clapeyron pressure conditions for the added fluids. Therefore, upon entering channel 460, the F vaporize and mix with the vapors of $F_1$ already flowing through channel 460.

The mixed vapors exit channel 460 at outlet 466 for mixing with additional vapors of $F_1$ flowing out of channels 462 at outlets 468.

Figure 5A:
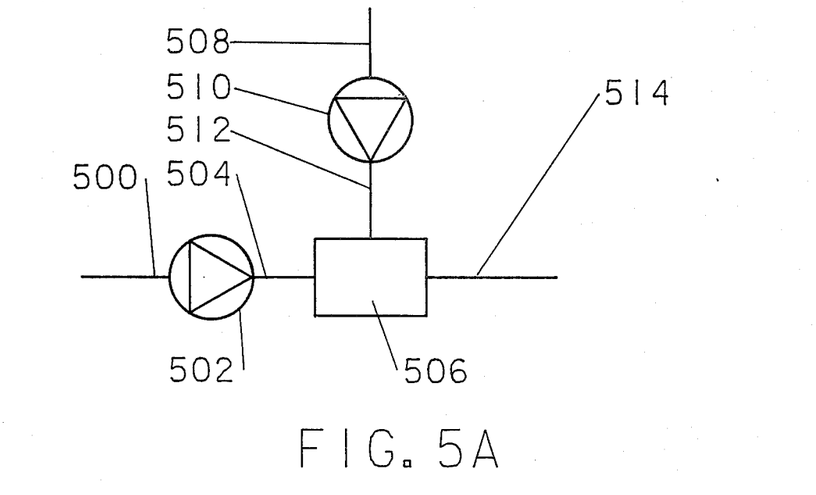
FIG. 5 is a schematic flow diagram for a system utilizing the preferred embodiment of the present invention.

Since the cross-sectional area of outlet pipe 408 is much larger than the combined cross-sectional area of channels 460 and 462, the mixed vapors of fluids exiting channels 460 and 462 decelerate upon entering chamber 412 and outlet pipe 408, and, as indicated by equation (6), above, the pressure in pipe 408 increases. However, even when the Clausius-Clapeyron pressure is exceeded, there is a short, transitory period during which the system is tending toward, but is not yet at thermodynamic equilibrium. During this transitory period, the kinetics describing the collapse of the supercooled vapors permit a tail of mixed, supercooled vapors to extend into pipe 408. Eventually these mixed vapors collapse to their equilibrium state in pipe 408 as an emulsified mixture.

The emulsifications resulting from the present invention are superior to emulsifications obtained from state of the art emulsifiers. For example, a single emulsification in regular emulsifiers produces particle sizes in the range of 10 to 25 microns. The present invention produces particles sizes in the range of a fraction of a micron, with maximum particle sizes in the range of no more than 2 microns. A regular state of the art emulsifier requires multiple, repeated emulsifications to achieve particle sizes in the range obtained from one emulsification in the present invention.

A solid phase of small particles may be injected into the vapor to serve as condensation nuclei.

The production of smaller particle size is, of course, important in the art of emulsification. For example, the present invention may be used to reduce the particle size of the fat in cream to 1 micron during the homogenization of milk. This small particle size prevents the formation of a film of cream on top of milk, as happens in the case of milk homogenized into larger fat particles.

The production of smaller particle size is also important in the emulsification of water and fuels such as gasoline, aviation fuel, jet fuel, diesel, heavy fuel and fuel oil. In addition to the greater heat efficiency obtained from fuels emulsified as smaller particles in water, described above, the greater proportion of water to fuel in such emulsions reduces the fire hazard of the fuel.

The present invention also produces finely emulsified mixtures of fluids, one or more of which may be a solution. For example, the present invention emulsified one part bunker "C" fuel oil and nine parts of a sodium or ammonium nitrate solution which is approximately 80 w/% solute into a thixotropic emulsification with particle sizes between 0.01 and 1 micron. The solute and a small volume of its solvent is completely encapsulated by a film of oil, which seals the solution, thereby greatly increasing the shelf life of the explosive mixture.

The ability of the present invention to emulsify Newtonian fluids, such as concentrated salt solutions and oil, into a thixotrope, such as describe above, is due to its ability to transfer a large quantity of energy to the fluids during emulsification. The present invention can therefore be used to produce a number of thixotropic emulsions. Mayonnaise, ketchup and paints are examples of thixotropes that may be produced by the present invention.

FIG. 5 shows a schematic representation of a system incorporating the preferred embodiment of the present invention, as was described above and illustrated in FIGS. 3 and 4. In FIG. 5A a fluid to be emulsified, $F_1$, flows from pipe 500 through pump 502 and pipe 504 into emulsifier 506 where it is accelerated as described above. By placing emulsifier 506 downstream from pump 502, the motive force from pump discharge may be used to supply the work necessary for vaporization. One or more other fluids to be emulsified, F, flow from pipe 508 through pump 510 and pipe 512 into emulsifier 506 where F is vaporized and mixed with vapors of $F_1$. The emulsified fluid flows from emulsifier 506 into outlet pipe 514.

Figure 5B:
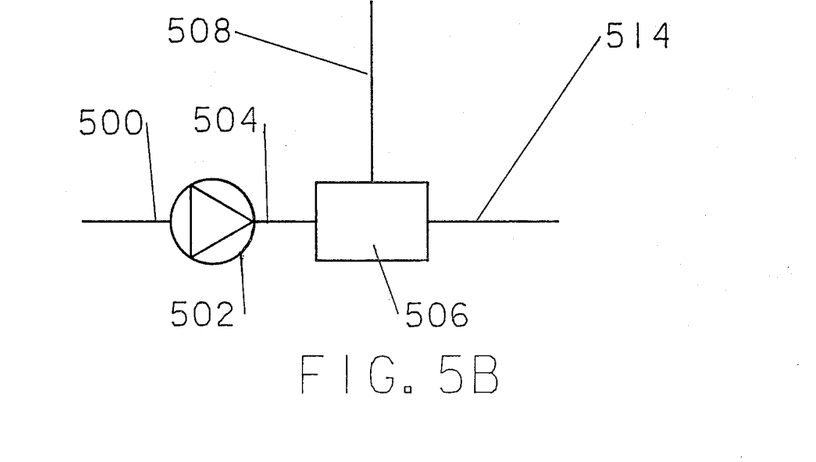

FIG. 5B illustrates that the low pressure available in the preferred embodiment of the present invention can be used to draw fluid into the emulsifier without pump 510. As in FIG. 5A, a fluid to be emulsified, $F_1$ flows from pipe 500 through pump 502 and pipe 504 into emulsifier 506 where it is accelerated as described above. In FIG. 5B, however, one or more other fluids to be emulsified, F, flow directly from pipe 508 into emulsifier 506, without pump 510. This self-feeding of F saves costs. As in FIG. 5A, F is vaporized in emulsifier 506 and mixed with vapors of $F_1$. The emulsified fluid flows from emulsifier 506 into outlet pipe 514.

EXAMPLE 1

Figure 6:
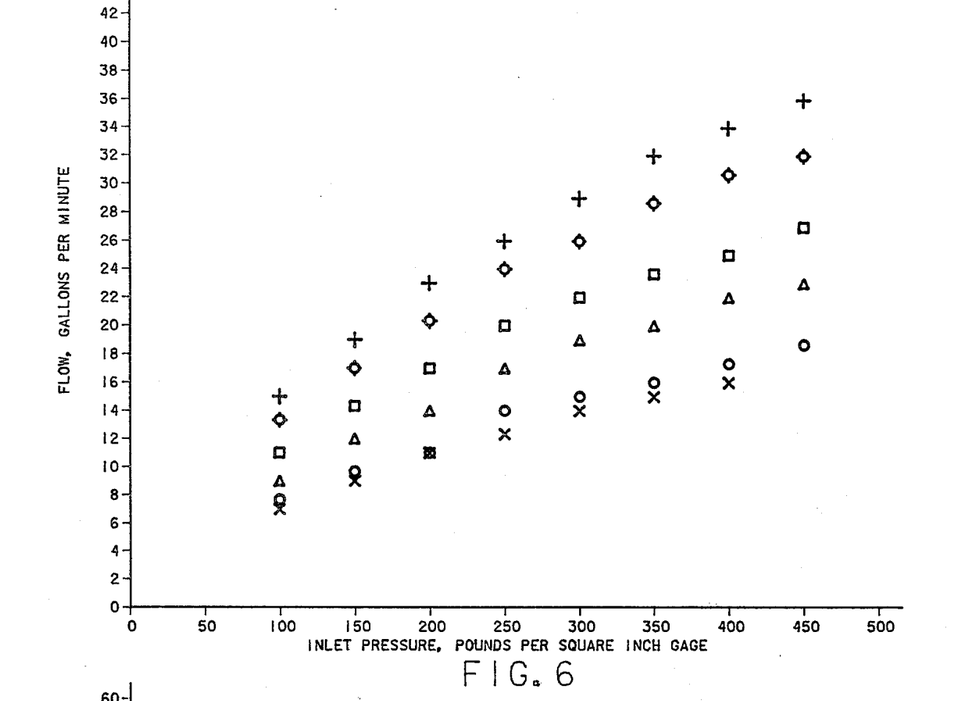
FIG. 6 is the experimentally-determined relationship between flow and inlet pressure for various configurations of the preferred embodiment of the present invention.

FIG. 6 illustrates the flow characteristics of an emulsifier built according to the preferred embodiment of the present invention having one inch inlet and outlet pipes, six constant diameter channels, and a central venturi channel.

Legend to FIG. 6

+ = 3/16 inch diameter venturi channel and six 3/32 inch diameter constant cross-sectional area channels, 180° F.;

-◊- = 5/32 inch diameter venturi channel and six 3/32 inch diameter constant cross-sectional area channels, 180° F.;

☐ = 5/32 inch diameter venturi channel and six 5/64 inch diameter constant cross-sectional area channels, 182° F.;

Δ = ⅛ inch diameter venturi channel and six 5/64 inch diameter constant cross-sectional area channels, 180° F.;

0 = ⅛ inch diameter venturi channel and six 1/16 inch diameter constant cross-sectional area channels, 160° F.;

X = 7/64 inch diameter venturi channel and six 1/16 inch diameter constant cross-sectional area channels, 185° F.

The data in FIG. 6 were obtained by measuring the flow, plotted in gallons of #6 fuel oil per minute on the vertical axis as a function of inlet pressure, plotted in pounds per square inch gauge on the horizontal axis, for various combinations of diameters of constant diameter channels and venturi channels.

The pressure in the venturi channel during the experiments conducted to obtain the data in FIG. 6 ranged from two to five psi absolute.

EXAMPLE 2

Figure 7:
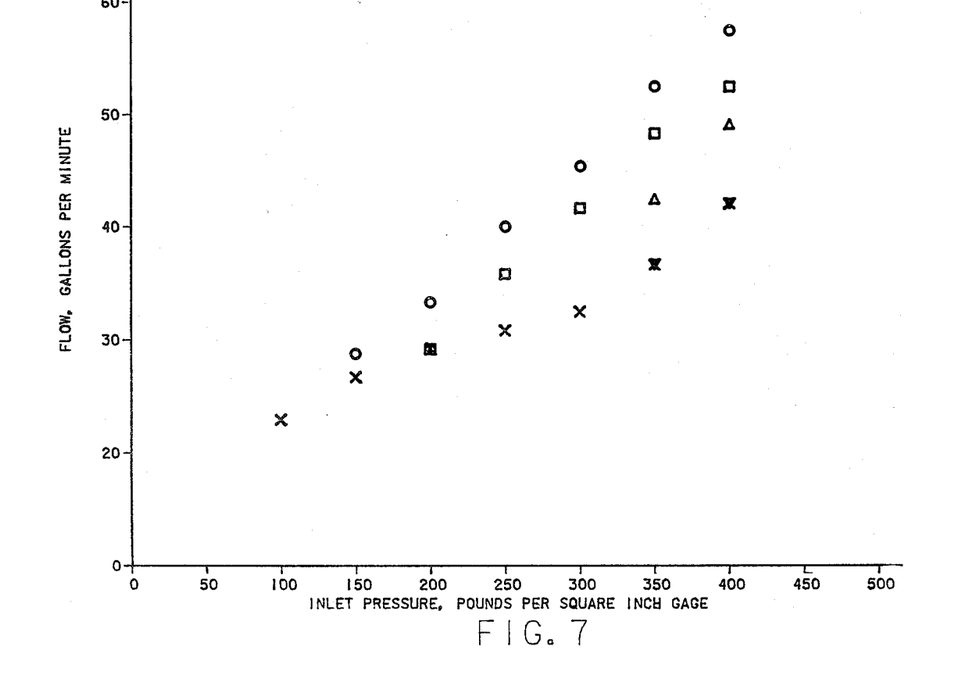
FIG. 7 is the experimentally-determined relationship between flow and inlet pressure for various outlet pressures.

FIG. 7 illustrates the flow characteristics of an emulsifier built according to the preferred embodiment of the present invention having 2 inch inlet and outlet pipes, eight ⅛ inch constant diameter channels, and a central venturi channel with a 3/16 inch minimum diameter at its construction.

Legend for FIG. 7

0 = 50 p.s.i. out;
☐ = 100 p.s.i. out;
Δ = 150 p.s.i. out;
∇ = 200 p.s.i. out, and
X = maximum pressure out.

The data in FIG. 7 were obtained by measuring the flow, plotted in gallons of #6 fuel oil per minute on the vertical axis as a function of inlet pressure, plotted in pounds per square inch gauge on the horizontal axis at various downstream outlet pressures, indicated by the symbol used to plot the individual data points.

The pressure in the venturi channel during the experiments conducted to obtain the data in FIG. 6 ranged from 2 to 3 psi absolute.

The curve depicted by the symbols for "maximum pressure out" is the flow measured as a function of inlet pressure at the maximum permissible outlet pressure for each inlet pressure. Outlet pressures in excess of those used to inlet pressure. Outlet pressures in excess of those used to construct the "maximum pressure" curve cause the low pressure required in the venturi channel to increase to pressures that are too high for vaporization of #6 fuel oil to occur.

EXAMPLE 3

Figure 8:
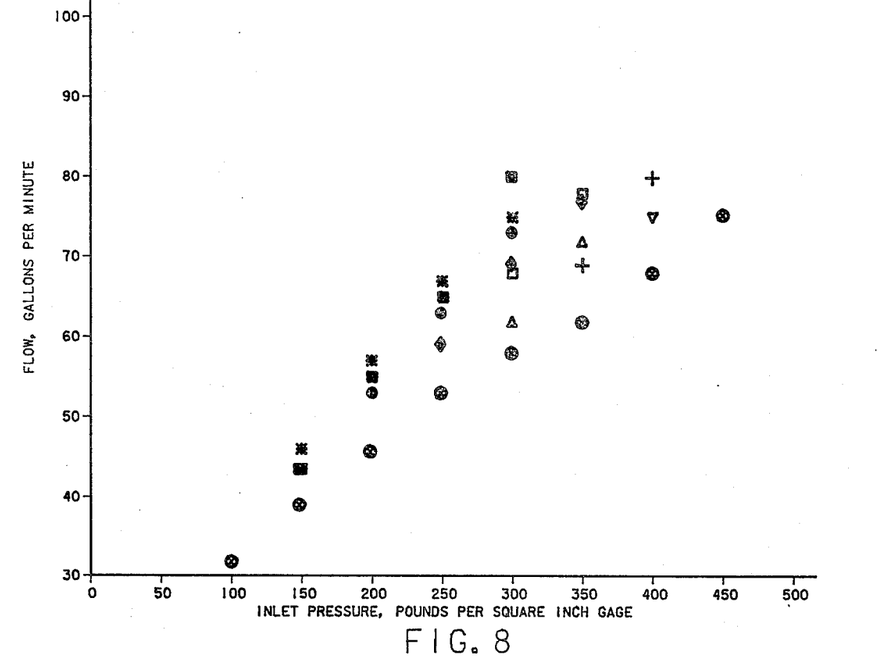
FIG. 8 is the experimentally-determined relationship between flow and inlet pressure for various outlet pressures for a different configuration of the present invention.

FIG. 8 illustrates the flow characteristics of an emulsifier built according to the preferred embodiment of the present invention having 2 inch inlet and outlet pipes, six 5/32 inch constant diameter channels, and a central venturi channel with a ⅛ inch minimum diameter at its construction.

Legend for FIG. 8

■ = 130° F. 50 psi out; * = 170° F. 50 psi out;
● = 170° F. 75 psi out; ☐ = 130° F. 100 psi out;
♦ = 170° F. 100 psi out; + = 130° F. 150 psi out;
Δ = 170° F. 150 psi out; ∇ = 170° F. 200 psi out;
0 = 130° F. maximum pressure out;
X = 170° F. maximum pressure out.

The data in FIG. 8 were obtained by measuring the flow, plotted in gallons of #6 fuel oil per minute on the vertical axis as a function of inlet pressure, plotted in pounds per square inch gauge on the horizontal axis at various downstream outlet pressures indicated in FIG. 8, and at two temperatures, indicated by the symbols used to plot the individual data points.

The pressure in the venturi channel during the experiments conducted to obtain the data in FIG. 8 ranged from 2 to 5 psi absolute.

The curve depicted by the symbols for "maximum pressure out" is the flow measured as a function of inlet pressure at the maximum permissible outlet pressure for each inlet pressure.

Figure 9:
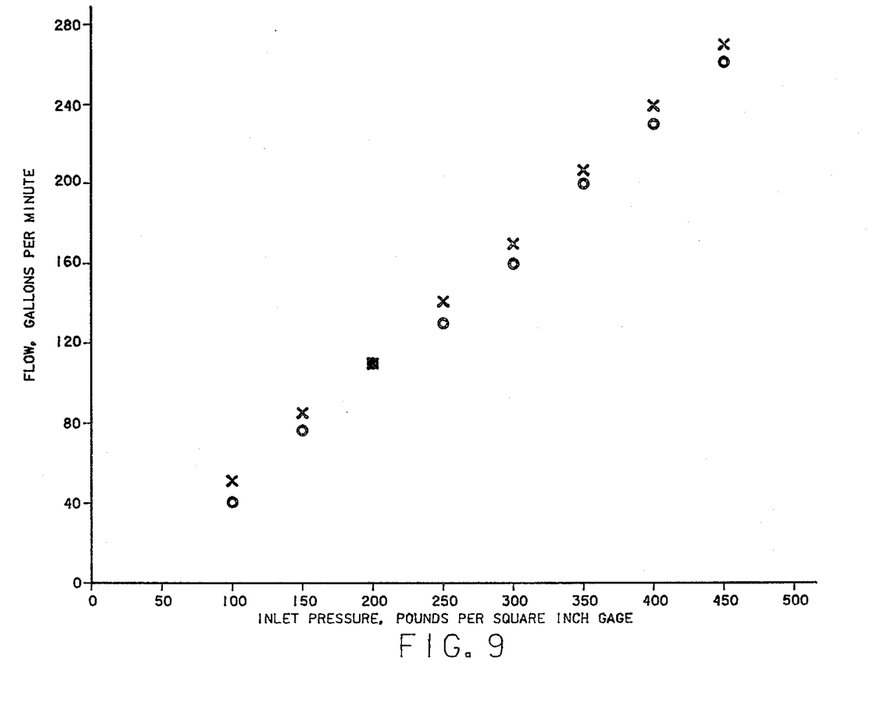
FIG. 9 is the experimentally-determined relationship between the maximum permissible outlet pressure and inlet pressure for the preferred embodiment of the present invention.

FIG. 9 illustrates the relationship between the inlet pressure and the "maximum pressure" as defined in connection with FIG. 8. Outlet pressures in excess of those used to construct the "maximum pressure" curve cause the low pressure required in the venturi channel required to increase to pressures that are too high for vaporization of #6 fuel oil to occur.

Legend for FIG. 9

0 = 130° F.; X = 170° F.

Although particular embodiments of the present invention have been described and illustrated herein, it should be recognized that modifications and variations may readily occur to those skilled in the art and that such modifications and variations may be made without departing from the spirit and scope of the present invention. Accordingly, all such modifications and variations are included in the scope of the invention as defined by the following claims.

We claim:

1. An emulsifying apparatus comprising:
    an inlet side and a first chamber, having a first cross-sectional area;
    an outlet side and a second chamber, having a second cross-sectional area;
    a passageway having a cross-sectional area smaller than said first and second cross-sectional areas, an inlet in fluid communication with said first chamber and an outlet in fluid communication with said second chamber, said passageway being long enough and having a cross-sectional area small enough that fluids will vaporize during passage between said first and second chambers; and
    said passageway comprising a central venturi tube in fluid communication with at least one inlet chamber, said venturi tube being surrounded by a plurality of fluid-carrying passageways of uniform cross-section extending parallel to the longitudinal axis of said venturi tube.

2. An apparatus as described in claim 1 wherein said first chamber is fluid communication with an inlet pipe and said second chamber is in fluid communication with an outlet pipe and said inlet channel is in fluid communication with an inlet pipe.

3. An apparatus as described in claim 2 wherein said inlet pipe contains a pressurized fluid between 100 and 450 psig, and said outlet pipe is at a lower pressure than said inlet pipe.

4. An apparatus as described in claim 3 wherein said inlet and outlet pipes are 1 to 2 inches in diameter, said inlet channels are cylinders ¼ inch in diameter, and said passageway comprises:
    a venturi having a minimum diameter of 3/32 to 3/16 inches at it maximum constriction surrounded radially by six to eight parallel passageways, each of which is a cylinder 1/16 to ¼ inches in diameter.

5. An apparatus as described in claim 4 wherein said inlet channel is in fluid communication with said venturi downstream of said minimum diameter construction.

* * * * *